United States Patent Office 3,062,870
Patented Nov. 6, 1962

3,062,870
DERIVATIVES OF ACETYLENIC CARBINOLS
Minoo Dossabhoy Mehta, Kensington, London, and Eric Robert Catlin, Betchworth, Surrey, England, assignors to Beecham Research Laboratories Limited, Betchworth, Surrey, England, a company of Great Britain
No Drawing. Filed Nov. 30, 1959, Ser. No. 855,961
Claims priority, application Great Britain Dec. 1, 1958
5 Claims. (Cl. 260—482)

This invention relates to derivatives of acetylenic carbinols and is particularly concerned with new derivatives of halogen-substituted ethynyl carbinols.

In the co-pending application Serial No. 785,124 of E. R. H. Jones filed 6th January, 1959, there are described and claimed certain halogen-substituted ethynyl carbinols which have valuable hypnotic and anti-apprehensive activities without undesirable side effects.

These compounds are of the general formula:

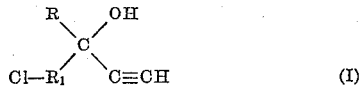
(I)

where R is an alkyl group having not more than four carbon atoms, R₁ is an alkylene group having not more than four carbon atoms, or R and R₁ together with the carbon atom to which they are attached are a cycloalkyl group.

A disadvantage of these compounds is that they exist as low boiling liquids and are, therefore, difficult to formulate in a manner suitable for human administration, the only practicable way being to enclose such liquids in a gelatine capsule.

We have now found that the acetylenic carbinols of the type described in the co-pending application Serial No. 785,124 of E. R. H. Jones filed 6th January 1959 may be converted by suitable methods into the corresponding carbamates which are solids and which possess hypnotic activity equal to or greater than that of the parent alcohol. These carbamates can be tabletted for oral administration in man.

The present invention accordingly provides new chemical compounds of the general formula:

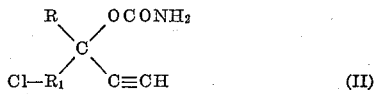
(II)

where R is an alkyl group having from 1 to 10 carbon atoms and R₁ is an alkylene group having from 1 to 4 carbon atoms, or R and R₁ together with the carbon atoms to which they are attached are a cycloalkyl group.

Compounds of this invention which possess particularly valuable hypnotic properties are those compounds of the general Formula II where R is an ethyl, n-propyl or n-butyl group and R₁ is CH₂.

This invention also includes a process for the preparation of compounds of the general Formula II wherein an acetylenic carbinol of the general Formula I is reacted with an aromatic chloroformate and the resulting carbonate ester is then reacted with liquid ammonia to produce the corresponding carbamate.

The reaction between the carbinol and the aromatic chloroformate, e.g., phenyl chloroformate, takes place in the presence of an organic tertiary base. An example of such a base is pyridine. The base is preferably used as a solvent but should be present in at least an amount sufficient to combine with the hydrogen chloride liberated by the reaction between the carbinol and the chloroformate. The reaction may be illustrated as follows:

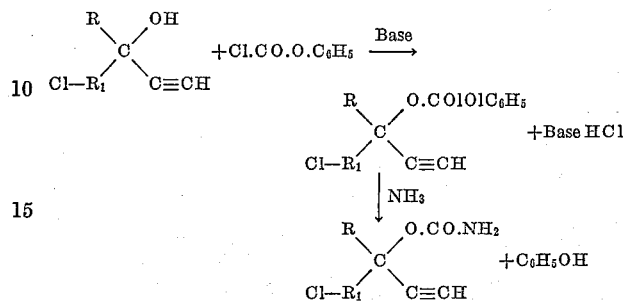

Alternatively, the compounds of the present invention may be prepared by reacting the carbinol of the general Formula I with phosgene in the presence of an organic tertiary base such as quinoline to give the crude chlorocarbonate. This is then reacted further with a solution of ammonia in an inert organic solvent such as ether to give the desired carbamate.

Since the compounds of the present invention contain asymmetric centres they can exist in several optically active forms and the present invention extends to these optically active forms as well as the corresponding racemic mixtures.

The compounds of the present invention may be employed in admixture with suitable pharmaceutical carriers in various medicinal dosage forms, but in view of the fact that the new compounds are solids they are particularly suitable for the manufacture of tablets for administration by the oral route. The present invention therefore also includes a composition comprising a pharmaceutical carrier and a compound of the general Formula II.

The following examples illustrate the invention:

*Example 1.—3-Chloromethylpent-1-Yn-3-Yl Carbamate*

Phenyl chloroformate (15.6 g.) was added dropwise to a cooled, well stirred, solution of 3-chloromethylpent-1-yn-3-ol (13.3 g.) in dried pyridine (40 ml.) and stirring was continued for 4 hours at 0° C. The reaction mixture was treated with ice-cold water (100 ml.) and the aqueous layer was extracted with ether (4 x 50 ml.). The ether layer was then washed with dilute hydrochloric acid (200 ml.), a saturated sodium bicarbonate solution (100 ml.) and a saturated sodium chloride solution (100 ml.). The ethereal solution was dried (MgSO₄), filtered, and the filtrate containing 3-chloromethylpent-1-yn-3-yl phenyl carbonate was added dropwise with stirring to liquid ammonia (200 ml.) at −40° C. After the addition, stirring was continued for 6 hours at −40° C. and ammonia was allowed to evaporate at room temperature overnight. The ether solution was first washed with sodium hydroxide solution (1 N. 2 x 100 ml.) to remove phenol and then with saturated sodium chloride solution (100 ml.). The ethereal solution was dried (MgSO₄) and the solvent removed under reduced pressure, and the residual solid on crystallisation from cyclohexane yielded 3-chloromethylpent-1-yn-3-yl carbamate (12.8 g., 73%) as colourless needles, M.P. 68–69° C. (Found: C, 47.7; H, 5.7; N, 7.8. $C_7H_{10}O_2NCl$ requires: C, 47.9; H, 5.7; N, 8.0%.)

Phenyl chloroformate (B.P. 38° C./0.6 mm. $n_D^{20}$ 1.5133) was obtained by reacting phenol with a solution of phosgene in toluene at 0° C. in the presence of dimethylaniline. 3-chloromethylpent-1-yn-3-ol was obtained as follows:

A solution of propylmagnesium bromide was prepared by adding a solution of n-propyl bromide (41 g.) in tetrahydrofuran (140 cc.) to magnesium turnings (9 g.) the addition being made in an atmosphere of nitrogen and with mechanical stirring. The resulting solution of propylmagnesium bromide was added dropwise at 20° C. to tetrahydrofuran (240 cc.) which had previously been saturated with acetylene. Acetylene was passed into the mixture during the addition and for a further ten minutes after the end of the reaction. The resulting product was a solution of ethynylmagnesium bromide in tetrahydrofuran.

The solution of ethynylmagnesium bromide was cooled in ice and chloromethyl ethyl ketone (20 g.) was added slowly with stirring. The mixture was stirred for two hours after the addition was complete, after which it was allowed to stand overnight. A saturated solution of ammonium chloride was added and the resulting mixture extracted with ether. The ether extract obtained was dried and the ether removed by distillation. The product was purified by distillation under reduced pressure to give 3-chloromethyl-pent-1-yn-3-ol, (12 g.), B.P. 73–75° C./18 mm. $n_D^{18}$=1.4700. Found: C, 53.9; H, 6.55; Cl, 27.0%. $C_6H_9OCl$ requires: C, 54.35; H, 6.85; Cl, 26.75%.

*Example 2.—3-Chloromethylpent-1-Yn-3-Yl Carbamate (Alternative Route)*

A solution of 3-chloromethylpent-1-yn-3-ol (6.65 g.) in dry toluene (10 ml.) was run into a well-stirred, ice-cold solution of phosgene in toluene (53 ml., of 12.5% w./w.). Quinoline (9.1 g.) was then added at 0° C. during 0.25 hour. Within 0.5 hour quinoline hydrochloride began to separate and the whole was stirred for a further 2.5 hours at 0° C. After allowing the reaction mixture to stand overnight at room temperature quinoline hydrochloride (10.2 g., 88%) was removed by filtration and thoroughly washed with dry ether.

To the combined washings and filtrate thus obtained a solution of liquid ammonia (5 ml.) in dry ether (50 ml.) was rapidly added with stirring at room temperature. An almost immediate precipitation of ammonium chloride occurred and after allowing to stand at room temperature for 0.5 hour, the precipitated ammonium chloride (2.8 g., 88%) was removed by filtration and washed thoroughly with dry ether. From the filtrate, the solvents were removed under reduced pressure and the residual gummy solid triturated with dry ether in order to extract the carbamate. The ether extract was then washed with dilute hydrochloric acid (2 x 50 ml., 2.5 N), aqueous saturated sodium bicarbonate solution (2 x 50 ml.) and water (50 ml.). The ethereal layer was dried ($MgSO_4$) and the solvent removed in vacuo to yield 3-chloromethyl-pent-1-yn-3-yl carbamate (4.4 g., 50%) which on crystallisation from cyclohexane was obtained as colourless needles, M.P. 68–69° C.

*Example 3.—4-Chloro-3-Methylpent-1-Yn-3-Yl Carbamate*

Reaction of phenyl chloroformate (15.6 g.) with 4-chloro-3-methylpent-1-yn-3-ol (13.3 g.) in pyridine (40 ml.) followed by reaction with ammonia as described in Example 1, yielded 4-chloro-3-methylpent-1-yn-3-yl carbamate (10.7 g., 61%) as colourless needles, M.P. 71–72° C., on crystallisation from cyclohexane. (Found: C, 48.3; H, 6.2; N, 8.3; Cl, 20.1. $C_7H_{10}O_2NCl$ requires: C, 47.9; H, 5.7; N, 8.0; Cl, 20.2%.)

4-chloro-3-methylpent-1-yn-3-ol was obtained by reacting 1-chloroethyl methyl ketone with ethynylmagnesium bromide in tetrahydrofuran by the method described in Example 1.

*Example 4.—5-Chloro-3-Methylpent-1-Yn-3-Yl Carbamate*

Reaction of phenyl chloroformate (10.4 g.) with 5-chloro-3-methylpent-1-yn-3-ol (8.8 g.) as described in Example 1 gave 5-chloro-3-methylpent-1-yn-3-yl carbamate (1.7 g., 15%) as colourless needles, M.P. 114–115° C., on crystallisation from cyclohexane. (Found: C, 48.1; H, 5.9; N, 8.1; Cl. 19.9. $C_7H_{10}O_2NCl$ requires: C, 47.9; H, 5.7; N, 8.0; Cl. 20.2%.)

5-chloro-3-methylpent-1-yn-3-ol was obtained by reacting 2-chloroethyl methyl ketone with ethynylmagnesium bromide by the method described in Example 1.

*Example 5.—3-Chloromethylbut-1-Yn-3-Yl Carbamate*

3-chloromethylbut-1-yn-3-ol (11.5 g.) was reacted with phenyl chloroformate (15.2 g.) in dry pyridine (40 ml.) at 0° C. and the intermediate phenyl carbonate was reacted directly with liquid ammonia as described in Example 1 to yield 3-chloromethylbut-1-yn-3-yl carbamate (8.7 g., 56%) which crystallised from cyclohexane as colourless needles, M.P. 64° C. (Found: C, 45.1; H, 5.2; N, 8.8; Cl, 22.8. $C_6H_8O_2NCl$ requires: C, 44.6; H, 5.0; N, 8.7; Cl, 22.0%.)

3-chloromethylbut-1-yn-3-ol (29%; B.P. 49–50° C./13 mm., $n_D^{20}$ 1.4645) was obtained by reacting chloroacetone with ethynylmagnesium bromide as described by Jones et al., J. Chem. Soc., 1956, 4765).

*Example 6.—3-Chloromethylhex-1-Yn-3-Yl Carbamate*

Reaction of phenyl chloroformate (11.7 g.) with 3-chloromethylhex-1-yn-3-ol (11 g.) in dry pyridine (40 ml.) at 0° C. followed by reaction with ammonia as described in Example 1, yielded 3-chloromethylhex-1-yn-3-yl carbamate (5.8 g., 41%) which on crystallisation from light petroleum (B.P. 40–60° C.)/cyclohexane was obtained as colourless needles, M.P. 44° C. (Found: C, 50.0; H, 6.0; N, 6.9; Cl, 18.5. $C_8H_{12}O_2NCl$ requires: C, 50.6; H, 6.3; N, 7.4; Cl, 18.7%.)

3-chloromethylhex-1-yn-3-ol (40%; B.P. 71° C.)/12 mm., $n_D^{20}$ 1.4649 was obtained by reacting chloromethyl n-propyl ketone with ethynylmagnesium bromide by the method described in Example 1.

*Example 7.—3-Chloromethyl-4-Methylpent-1-Yn-3-Yl Carbamate*

Phenyl chloroformate (9.3 g.) was added dropwise during 20–30 minutes to a well-stirred solution of 3-choloromethyl-4-methylpent-1-yn-3-ol (7.3 g.) in dry pyridine (30 ml.) at 0° C. The whole was then stirred for 4–6 hours at room temperature and the reaction mixture was worked up as in Example 1. The ethereal solution of the phenylcarbonate thus obtained was mixed with an equal volume of liquid ammonia in a Dewar flask. After allowing to stand overnight, more dry ether (ca. 200 ml.) was added, excess ammonia allowed to evaporate at room temperature and the resulting ethereal solution was treated as described in Example 1, to yield 3-chloro-methyl-4-methylpent-1-yn-3-yl carbamate (6 g., 64%) which after crystallisation from cyclohexane was obtained as colourless micro-prisms, M.P. 91–92° C. (Found: C, 50.6; H, 6.5; N, 7.3. $C_8H_{12}O_2NCl$ requires; C. 50.6; H, 6.3; N, 7.4%.)

3 - chloromethyl - 4 - methylpent-1-yn-3-ol (31%; B.P. 79° C./20 mm., $n_D^{22}$ 1.4668) was obtained by reacting chloromethyl isopropyl ketone with ethynylmagnesium bromide as described in Example 1.

Example 8.—3-Chloromethylhept-1-Yn-3-Yl Carbamate

Reaction of phenyl chloroformate (9.3 g.) with 3-chloromethylhept-1-yn-3-ol (8 g.) in dry pyridine (25 ml.) followed by reaction with liquid ammonia as in Example 6, yielded 3-chloromethylhept-1-yn-3-yl carbamate (8.8 g., 87%) which crystallised from light petroleum (B.P. 40–60° C.)/cyclohexane as colourless micro-prisms, M.P. 71° C. (Found: C, 52.5; H, 7.0; N, 7.1. Cl, 17.1. $C_9H_{14}O_2NCl$ requires: C, 53.1; H, 6.9; N, 6.9; Cl, 17.4%.)

3-chloromethylhept-1-yn-3-ol (60%; B.P. 92° C./14 mm., $n_D^{21}$ 1.4640) was obtained by reacting chloromethyl n-butyl ketone with ethynylmagnesium bromide by the method described in Example 1.

Example 9.—3-Chloromethyl-5-methylhex-1-Yn-3-Yl Carbamate

Action of phenyl chloroformate (7.83 g.) on a solution of 3-chloromethyl-5-methylhex-1-yn-3-ol (8 g.) in pyridine (40 ml.) as in Example 6, yielded 3-chloromethyl-5-methylhex-1-yn-3-yl carbamate (4 g., 39%) which crystallised from light petroleum (B.P. 30–40° C.) as colourless micro-prisms, M.P. 56–57° C. (softens 35° C.). (Found: C, 53.3; H, 7.1; N, 6.8; Cl, 17.2. $C_9H_{14}O_2NCl$ requires: C, 53.1; H, 6.9; N, 6.9; Cl, 17.4%.)

3 - chloromethyl - 5 - methylhex - 1-yn-3-ol (24%; B.P. 51° C./0.7 mm. $n_D^{20}$ 1.4630) was obtained by reacting chloromethyl isobutyl ketone with ethynylmagnesium bromide by the method described in Example 1.

Example 10.—3-Cholormethyl-4-Methylhex-1-Yn-3-Yl Carbamate

Reaction of phenyl chloroformate (11.7 g.) with 3-cholormethyl-4-methylhex-1-yn-3-ol (10 g.) in pyridine (40 ml.) as in Example 6, yielded 3-chloromethyl-4-methylhex-1-yn-3-yl carbamate (8.4 g., 66%). The latter on crystallisation from light petroleum (B.P. 40–60° C.)/cyclohexane was obtained as colourless plates, M.P. 60–61° C. (Found: C, 53.6; H, 7.3; N, 7.1; Cl, 17.3. $C_9H_{14}O_2NCl$ requires: C, 5.31; H, 6.9; N, 6.9; Cl, 17.4%.)

3-chloromethyl-4-methylhex-1-yn-3-ol (24%; B.P. 90° C./15 mm., $n_D^{20}$ 1.4685) was obtained by reacting chloromethyl sec.butyl ketone with ethynylmagnesium bromide in tetrahydrofuran by the method described in Example 1.

Example 11.—4-chloro-3-Ethylpent-1-Yn-3-Yl Carbamate 4-chloro-3-ethylpent-1-yn-3-ol (5.86 g.) dissolved in dry pyridine (35 ml.) was reacted with phenyl choloformate (7.8 g.) as described in Example 6. After reaction with liquid ammonia the resulting ethereal solution yielded a gummy solid which on heating in vacuo (bath temperature 55–60° C./1.5 mm.) yielded some unreacted carbinol (1.1 g., 19%). The residual oil on trituration with light petroleum (B.P. 40–60° C.) solidified. After crystallisation from cyclohexane 4-chloro-3-ethylpent-1-yn-3-yl carbamate (2.9 g., 38%) was obtained as colourless prisms, M.P. 90° C. (Found: C, 50.9; H, 6.6; N, 7.2. $C_8H_{12}O_2NCl$ requires: C, 50.6; H, 6.3; N, 7.4%.)

4-chloro-3-ethylpent-1-yn-3-ol (40%; B.P. 70° C./15 mm., $n_D^{20}$ 1.4660) was obtained by reacting 1-chloroethyl ethyl ketone with ethynylmagnesium bromide in tetrahydrofuran by the method described in Example 1.

Example 12—3-Chloromethyloct-1-Yn-3-Yl Carbamate

By reacting 3-chloromethyloct-1-yn-3-ol (8.7 g.) in dry pyridine (30 ml.) with phenyl chloroformate (9.3 g.) as described in Example 6, 3-chloromethyloct - 1 - yn - 3 - yl carbamate (7.7 g., 71%) was obtained. The latter crystallised from light petroleum (B.P. 30–40° C.) as colourless micro-prisms, M.P. 51° C. (Found: C, 55.1; H, 7.6; N, 6.2. $C_{10}H_{16}O_2NCl$ requires: C, 55.2; H, 7.4; N, 6.4%.

3-chloromethyloct-1 - yn - 3 - ol (41%, B.P. 75° C./15 mm., $n_D^{20}$ 1.4640) was obtained by reacting chloromethyl n-amyl ketone with ethynylmagnesium bromide by the method described in Example 1.

Example 13.—3-Chloromethylnon-1-Yn-3-Yl Carbamate

Treatment of a solution of 3-chloromethylnon-1-yn-3-ol (9.4 g.) in dry pyridine (25 ml.) with phenyl chloroformate (9.3 g.) at 0° C. as in Example 6 yielded 3-choloromethylnon-1-yn-3-yl carbamate (10.8 g., 93%), which on crystallisation from light petroleum (B.P. 40–60° C.) was obtained as colourless micro-prisms, M.P. 47–48° C. (Found: C, 57.2; N, 5.7; H, 8.0; Cl, 15.0. $C_{11}H_{18}O_2NCl$ requires: C, 57.0; H, 7.8; N, 6.1; Cl 3-chloromethylnon-1-yn-3-ol (38%; B.P. 91° C./2 mm., $n_D^{24}$ 1.4637) was obtained by reacting chloromethyl-n-hexyl ketone with ethynylmagnesium bromide by the method described in Example 1.

Example 14.—2-Chloro-1-Ethynylcyclohexyl Carbamate

Reaction of 1-ethynyl-2-chlorocyclohexanol (12 g.) in pyridine (35 ml.) with phenyl chloroformate (13.9 g.) as described in Example 6, yielded 2-chloro-1-ethynylcyclohexyl carbamate (12.3 g., 81%). This on crystallisation from cyclohexane was obtained as colourless prisms, M.P. 109° C. (Found: C, 54.0; H, 6.3; N, 6.7; Cl, 17.5. $C_9H_{12}O_2NCl$ requires: C, 53.6; H, 6.0; N, 7.0; Cl, 17.6%.)

2-chloro-1-ethynylhexanol was obtained by reacting 2-chlorocyclohexanone with ethynylmagnesium bromide in tetrahydrofuran by the method described in Example 1.

What we claim is:

1. Compounds of the general formula:

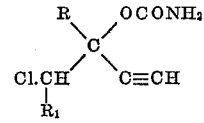

where R is selected from the group consisting of alkyl groups having less than eleven carbon atoms and groups forming with $R_1$ and the carbon atom to which R and $R_1$ are attached a cyclohexyl group, and $R_1$ is selected from the group consisting of hydrogen and methyl.

2. Compounds of the general formula:

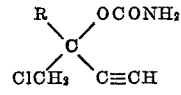

where R is a straight chain alkyl group having from 2 to 4 carbon atoms inclusive.

3. 3-chloromethylpent-1-yn-3-yl carbamate.
4. 3-chloromethylhex-1-yn-3-yl carbamate.
5. 3-chloromethylhmept-1-yn-3-yl carbamate.

References Cited in the file of this patent

UNITED STATES PATENTS

| | | |
|---|---|---|
| 2,791,603 | Bavley et al. | May 7, 1957 |
| 2,816,910 | Junkmann et al. | Dec. 17, 1957 |

OTHER REFERENCES

R. V. Rice, Jour. Am. Pharm. Assoc., Sci. Ed., vol. 33, No. 9, consecutive No. 17, September, 1944, pp. 289–297.

W. M. McLamore et al., Jour. Org. Chem., vol. 20, No. 10, October, 1955, pp. 1379–1382.